(12) United States Patent
Wu

(10) Patent No.: US 8,838,089 B2
(45) Date of Patent: Sep. 16, 2014

(54) METHOD OF IMPROVING RADIO RESOURCE CONTROL CONNENCTION ESTABLISHMENT IN A WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 529 days.

(21) Appl. No.: 12/254,834

(22) Filed: Oct. 20, 2008

(65) Prior Publication Data

US 2010/0099402 A1 Apr. 22, 2010

(51) Int. Cl.
*H04W 24/00* (2009.01)
*H04W 76/02* (2009.01)

(52) U.S. Cl.
CPC ................................. *H04W 76/027* (2013.01)
USPC ..... 455/423; 455/436; 455/435.1; 455/432.1; 455/458; 455/560; 370/328; 370/329; 370/322; 370/332; 370/335

(58) Field of Classification Search
USPC ........... 455/423, 435.1, 436, 509, 458, 432.1; 370/328–329, 322, 332, 335
See application file for complete search history.

(56) References Cited

U.S. PATENT DOCUMENTS

| 2008/0039094 A1* | 2/2008 | Jeong et al. ................... 455/436 |
| 2008/0225785 A1* | 9/2008 | Wang et al. ................... 370/329 |
| 2009/0239563 A1* | 9/2009 | Ou et al. ....................... 455/509 |

FOREIGN PATENT DOCUMENTS

| EP | 1 383 348 A1 | 1/2004 |
| EP | 1 993 314 A | 11/2008 |

OTHER PUBLICATIONS

3GPP, 3GPP TS 36.331 v8.2.0, May 2008.
3GPP, 3GPP TS 24.301 v0.4.0-cl, Jul. 2008.
3GPP, 3GPP Tdoc R2-083738 "Establishment cause and access class barring clarification", Jun. 2008.
3GPP, 3GPP TS 24.301 v0.4.0-rm, Jul. 2008.
NTT Docomo, Inc: "RRC connection reject handling and T302, T303, T305", 3GPP TSG RAN WG2 #63, Tdoc-R2-084703, pp. 1-11, Aug. 18-22, 2008, XP050319677.
3GPP TS 36.331 V8.3.0 (Sep. 2008), 3rd Generation Partnership Project; Technical Specification Group Radio Access Network; Evolved Universal Terrestrial Radio Access (E-UTRA) Radio Resource Control (RRC); Protocol specification (Release 8), cover page+ p. 27-41, 64-67, 93-99 and 157.
Panasonic, "SRB for NAS message during RRC connection re-establishment", 3GPP TSG RAN WG2 RRC #63bis, R2-085101, Sep. 29-Oct. 3, 2008, Prague, Czech.
NEC, Ericsson, "Attach and tracking area update attempt counters", 3GPP TSG CT WG1 Meeting #55bis, C1-084491, Oct. 6-10, 2008, Phoenix, Arizona (USA).
3GPP TS 24.301 V1.0.0 (Sep. 2008), 3rd Generation Partnership Project; Technical Specification Group Core Network and Terminals; Non-Access-Stratum (NAS) protocol for Evolved Packet Sytem (EPS); Stage 3 (Release 8), cover page+ p. 16.
Office action mailed on Mar. 20, 2013 for the Taiwan application No. 098135395, filing date Oct. 20, 2009, p. 1-11.

* cited by examiner

*Primary Examiner* — Michael T Vu
(74) *Attorney, Agent, or Firm* — Winston Hsu; Scott Margo

(57) ABSTRACT

A method of improving Radio Resource Control, abbreviated to RRC, connection establishment for an RRC layer of a user equipment in a wireless communication system, the method including when a specific event occurs during an RRC connection establishment procedure, initiating the RRC connection establishment procedure based on completion of the specific event.

17 Claims, 14 Drawing Sheets

METHOD OF IMPROVING RADIO RESOURCE CONTROL CONNECTION ESTABLISHMENT IN A WIRELESS COMMUNICATION SYSTEM AND RELATED COMMUNICATION DEVICE

BACKGROUND OF THE INVENTION

1. Field of the Invention

The present invention relates to a method and related communication device in a wireless communication system for improving Radio Resource Control (RRC) connection establishment, and more particularly, to a method and related communication device for improving re-initiation of Non Access Stratum (NAS) procedures as a result of lower layer failure, for establishing an RRC connection more efficiently.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a UE in idle mode establishes a Radio Resource Control (RRC) connection for signalling or data transmission. The UE sends an RRC connection request message including an RRC connection establishment cause to an eNB to request to establish an RRC connection. The eNB uses the RRC connection establishment cause to prioritize the RRC connection request from the UE, e.g. at high load situations. Therefore, the UE has to include the correct RRC connection establishment cause for the eNB to prioritize the RRC connection establishment. Currently, in the LTE system, RRC connection establishment causes are defined as follows: emergency call, high priority access, Mobile Terminating (MT) access, Mobile Originating (MO) signaling and MO data.

These RRC connection establishment causes are mainly used by the network to differentiate the subsequent action upon receiving the RRC connection request message. For example, the RRC connection establishment cause can be used to perform a call admission control. On the other hand, an access barring control is performed to prioritize access of Non Access Stratum (NAS) connection request types, which are mapped to RRC connection establishment causes.

According to current 3GPP Technical Specifications, UE NAS performs a NAS procedure, such as a Tracking Area Update (TAU) procedure, an attach procedure or a service request procedure, to request UE RRC to establish an RRC connection. When a lower layer failure such as cell reselection or cell barred occurs, UE NAS re-initiates the NAS procedure to establish the RRC connection. Note that, cell barred is an event occurred when a cell is considered barred during the initiation of an RRC connection establishment. During cell barred, the UE performs access barring control function to limit the UE to perform the specific access. Current method of initiating the NAS procedure results in an aborted NAS procedure or unnecessary waiting time for RRC connection establishment, which are illustrated in FIG. 1 to FIG. 8 and are described by issues as below.

First note that, it is specified that when cell reselection occurs during RRC connection establishment, the UE informs upper layers of the failure to establish the RRC connection, upon which the procedure ends. Please refer to FIG. 1, which is a sequence diagram of a TAU procedure, for issue 1. As shown in FIG. 1, the UE performs the TAU procedure via a cell 1. NAS transmits a TAU request message to request RRC to establish an RRC connection. Before the RRC connection is established, RRC performs cell reselection to a cell 2 with the same Tracking Area (TA) as the cell 1. In this situation, RRC indicates a failure message to NAS, and NAS starts a timer T3411 accordingly. The timer T3411 is a timer starting at the TAU procedure failure or at an attach procedure failure due to lower layer failures, and currently the period of the timer T3411 is specified as 10 seconds. According to current NAS specification, NAS cannot initiate the TAU procedure until the timer T3411 expires. As a result, the UE cannot have service access, make a MO call or receive a MT call before the TAU procedure is completed, even if cell reselection is completed much earlier. A similar issue may also occur for the attach procedure.

Please refer to FIG. 2, which is a sequence diagram of a service request procedure, for issue 2. The UE receives a paging message for a MT call, and NAS sends a service request message as a paging response to request RRC to initiate an RRC connection establishment procedure. Before the RRC connection is established, RRC performs cell reselection, so as to terminate the RRC connection establishment procedure and indicate a failure message to NAS. However, NAS behavior is not specified in current specification when NAS receives the failure message from RRC during the service request procedure. As a result, NAS does not retransmit the service request message, and apparently, nothing is done. The MT call could be missed because the UE hangs up the calls due to no answering or call entering voice box.

It is specified that if a cell is considered barred during the initiation of RRC connection establishment, the UE informs upper layers of the failure to establish the RRC connection, upon which the procedure ends. Please refer to FIG. 3, which is a sequence diagram of a TAU procedure, for issue 3. The UE performs a TAU procedure via a cell with access barring for signalling is configured. RRC receives a TAU request message and draws a random value "rand" 0≤rand<1. This random value is greater than or equal to an access probability factor, so RRC considers the cell barred and starts a timer T305 accordingly. Meanwhile, RRC indicates a failure message to NAS to start the timer T3411. Note that the timer T305 is equal to (0.7+0.6×rand)×accessBarringTime, where a value of the parameter "accessBaringTime" is a time length configured in one of {4 s, 8 s, 16 s, 32 s, 64 s, 128 s, 256 s, 512 s}. As mentioned previously, the UE cannot initiate the TAU procedure until the timer T3411 expires. In other words, the UE cannot have service access, make a MO call or receive a MT call before the TAU procedure is completed, even if the timer T305 expires earlier than the timer T3411. A similar issue may also occur for an attach procedure.

Please refer to FIG. 4, which is a sequence diagram of a service request procedure, for issue 4. The UE performs the service request procedure via a cell with access barring for originating calls is configured. Please note that NAS starts a timer T3417, which is specified as 5 seconds in current specification, when sending a service request message. RRC receives the service request message and draws a random value "rand", which is described previously, considers the cell barred and starts a timer T303 accordingly. Similar to the timer T305, the timer T303 is also equal to (0.7+0.6×rand)× accessBarringTime. Meanwhile, RRC indicates a failure message to NAS due to cell barred. After the timer T3417 expires, NAS aborts the service request procedure and does not retransmit the service request message. As a result, the UE cannot initiate the service request procedure even if the timer T303 expires earlier than the timer T3417.

From the above, FIG. 1 and FIG. 2 illustrate that cell reselection occurs during the TAU/Attach procedure and the service request procedure; and on the other hand, FIG. 3 and FIG. 4 illustrate that cell barred occurs during the TAU/Attach procedure and the service request procedure.

Please refer to FIG. 5 and FIG. 6 for issue 5. FIG. 5 is a sequence diagram of a service request procedure illustrating a collision of a MO call and a paging occurs after cell barred occurs. FIG. 6 is a sequence diagram of a service request procedure illustrating a collision of a MO call and a paging occurring after cell reselection occurs. As shown in FIG. 6, NAS sends a service request message of a MO call and starts the timer T3417. Before the RRC connection is established, RRC performs cell reselection and indicates a failure message to NAS. Next, a paging is received. It is not clearly specified in current NAS specification whether the UE can send another service request message for a different purpose, e.g. a paging response or an emergency call, when the original service request procedure is pending. As a result, the MT call could be missed because the UE does not send the service request message for a paging response. The scenario in FIG. 5 is similar to the scenario in FIG. 6, and is not repeated here.

Please refer to FIG. 7, which is a sequence diagram of a periodic TAU procedure, for issue 6. At the beginning, a periodic TAU timer expires and the UE receives a paging message. It is specified that a service request procedure can only be initiated when no UE-initiated Evolved Packet System Mobility Management (EMM) specific procedure, such as a TAU procedure, an attach procedure or a detach procedure, is ongoing. Therefore the UE performs the periodic TAU procedure first. However, the UE performs the periodic TAU procedure via a cell with access barring for signalling is configured. RRC draws a random value "rand" greater than or equal to an access probability factor so RRC considers the cell barred and starts the timer T305 accordingly. Meanwhile, RRC indicates a failure message to NAS to start a timer T3411. After the timer T3411 expires, NAS retransmits the TAU request message. It is not specified that whether the UE re-initiates the service request procedure after the TAU procedure terminates (receiving a failure message in this case). Consequently, the MT call could be missed.

Please refer to FIG. 8, which is a sequence diagram of a TAU procedure, for issue 7. The UE receives a paging message from an eNB 1 and cell reselection occurs. The UE reselects to an eNB 2 with a different tracking area and performs a TAU procedure. Since the service request procedure can only be initiated when no UE-initiated EMM specific procedure is ongoing, the UE performs the TAU procedure first and puts a paging response aside. However, the UE performs the TAU procedure via the eNB 2 with access barring for signaling is configured. In this situation, RRC draws a random value greater than or equal to access probability factor so RRC considers the cell barred and starts the timer T305 accordingly. Meanwhile, RRC indicates a failure message to NAS to start a timer T3411. NAS retransmits the TAU request message after the timer T3411 expires. Note that in this scenario, the timer T305 is longer than the timer T3411. That is, cell barred is not yet released, so the TAU request procedure cannot be completed successfully, and therefore RRC indicates the failure message again to NAS. As a result, the MT call could be missed because the UE hangs up the calls due to no answering or call entering voice box. Briefly, the UE performs the TAU procedure first and puts the paging response with MT access as the RRC connection establishment cause aside, and therefore the MT call could be missed.

In summary, the above seven issues shows that in current 3GPP specifications NAS and RRC behaviors may be time-consuming for RRC connection establishment, RRC connection establishment failure, or missed MT calls.

SUMMARY OF THE INVENTION

The present invention therefore provides a method and related communication device for improving RRC connection establishment for an RRC layer and a NAS layer of a UE in a wireless communication system to solve the abovementioned problems in the prior art.

The present invention discloses a method of improving RRC connection establishment for an RRC layer of a UE in a wireless communication system. The method includes when a specific event occurs during an RRC connection establishment procedure, initiating the RRC connection establishment procedure based on completion of the specific event.

The present invention further discloses a communication device of a wireless communication system for improving RRC connection establishment. The communication device includes a processor, a communication interfacing unit, a control unit, a computer readable recording medium. The processor is used for processing storage data. The communication interfacing unit is used for exchanging signals with a peer communication device of the wireless communication system. The control unit is coupled to the processor and the communication interfacing unit, and is used for controlling the communication interfacing unit and the communication device according to processing results of the processor. The computer readable recording medium is coupled to the processor and is used for storing the storage data. The storage data includes program code for initiating the RRC connection establishment procedure based on completion of the specific event when a specific event occurs during an RRC connection establishment procedure.

The present invention further discloses a method of improving RRC connection establishment for a NAS layer of a UE in a wireless communication system. The method includes permitting initiating a second service request procedure when a first service request procedure is pending.

The present invention further discloses a communication device of a wireless communication system for improving RRC connection establishment. The communication device includes a processor, a communication interfacing unit, a control unit, a computer readable recording medium. The processor is used for processing storage data. The communication interfacing unit is used for exchanging signals with a peer communication device of the wireless communication system. The control unit is coupled to the processor and the communication interfacing unit, and is used for controlling the communication interfacing unit and the communication device according to processing results of the processor. The computer readable recording medium is coupled to the processor and is used for storing the storage data. The storage data includes program code for permitting initiating a second service request procedure when a first service request procedure is pending.

The present invention further discloses a method of improving RRC connection establishment in a NAS layer of a UE in a wireless communication system. The method includes when a service request procedure is triggered but cannot be initiated due to an ongoing periodic TAU procedure, initiating the service request procedure after the periodic TAU procedure is completed or aborted.

The present invention further discloses a communication device of a wireless communication system for improving RRC connection establishment. The communication device includes a processor, a communication interfacing unit, a control unit, a computer readable recording medium. The processor is used for processing storage data. The communication interfacing unit is used for exchanging signals with a peer communication device of the wireless communication system. The control unit is coupled to the processor and the communication interfacing unit, and is used for controlling the communication interfacing unit and the communication device according to processing results of the processor. The computer readable recording medium is coupled to the processor and is used for storing the storage data. The storage data includes program code for when a service request procedure is triggered but cannot be initiated due to an ongoing periodic TAU procedure, initiating the service request procedure after the periodic TAU procedure is completed or aborted.

The present invention further discloses a method of improving RRC connection establishment for an RRC layer of a UE in a wireless communication system. The method includes when the UE has a plurality of NAS messages pending for transmission in an idle mode, initiating an RRC connection establishment procedure according to one of the plurality of NAS messages with a higher priority RRC connection establishment cause.

The present invention further discloses a communication device of a wireless communication system for improving RRC connection establishment. The communication device includes a processor, a communication interfacing unit, a control unit, a computer readable recording medium. The processor is used for processing storage data. The communication interfacing unit is used for exchanging signals with a peer communication device of the wireless communication system. The control unit is coupled to the processor and the communication interfacing unit, and is used for controlling the communication interfacing unit and the communication device according to processing results of the processor. The computer readable recording medium is coupled to the processor and is used for storing the storage data. The storage data includes program code for when the communication device has a plurality of NAS messages pending for transmission in an idle mode, initiating an RRC connection establishment procedure according to one of the plurality of NAS messages with a higher priority RRC connection establishment cause.

These and other objectives of the present invention will no doubt become obvious to those of ordinary skill in the art after reading the following detailed description of the preferred embodiment that is illustrated in the various figures and drawings.

DETAILED DESCRIPTION

Figure 9:
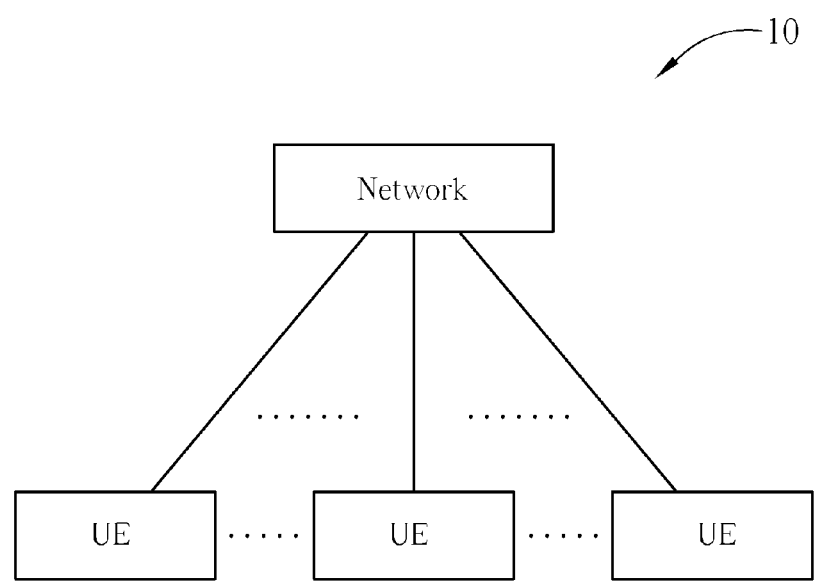
FIG. 9 is a schematic diagram of a wireless communication system.

Please refer to FIG. 9, which is a schematic diagram of a wireless communication system 10 according to an embodiment of the present invention. The wireless communication system 10, such as an LTE (long-term evolution) system or other mobile communication systems, is briefly composed of a network and a plurality of user equipments (UEs). In FIG. 9, the network and the UEs are simply utilized for illustrating the structure of the wireless communication system 10. Practically, the network comprising a plurality of base stations, such as an E-UTRAN (evolved-UTAN) comprising a plurality of evolved Node-Bs (eNBs) in the LTE system. The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 10:
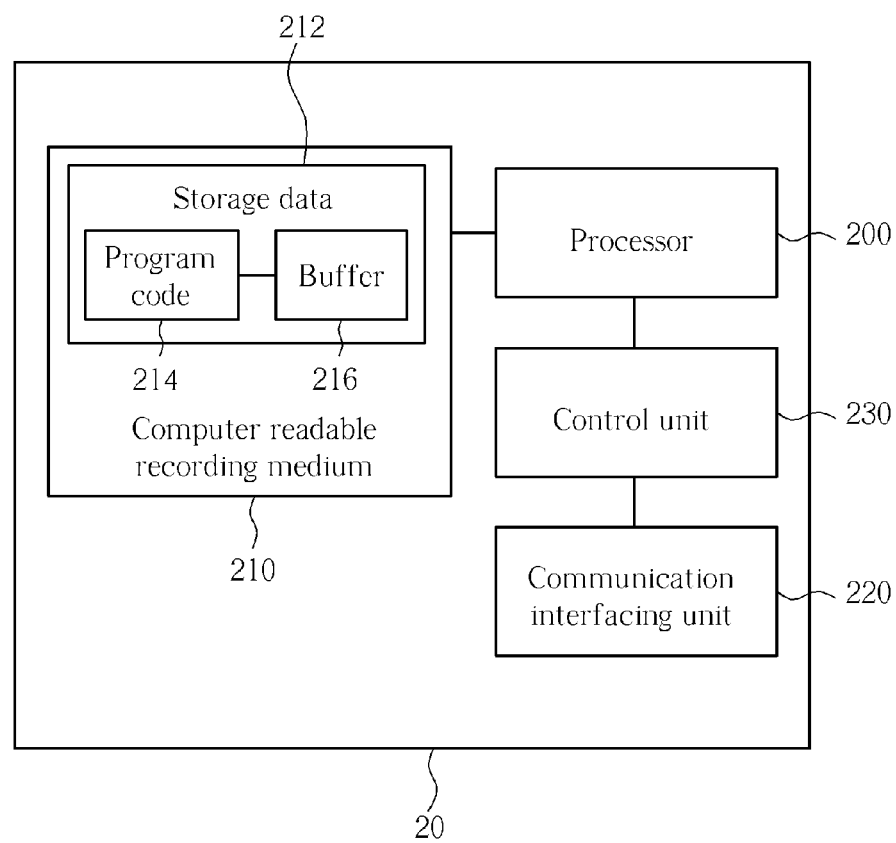
FIG. 10 is a schematic diagram of a communication device according to an embodiment of the present invention.

Please refer to FIG. 10, which is a schematic diagram of a communication device 20 according to embodiments of the present invention. The communication device 20 can be the UE shown in FIG. 9 and includes a processor 200, a computer readable recording medium 210, a communication interfacing unit 220 and a control unit 230. The computer readable recording medium 210 may be any data storage device that stores storage data 212, including program code 214 and a buffer 216, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver for wirelessly communicating with the network.

Figure 11:
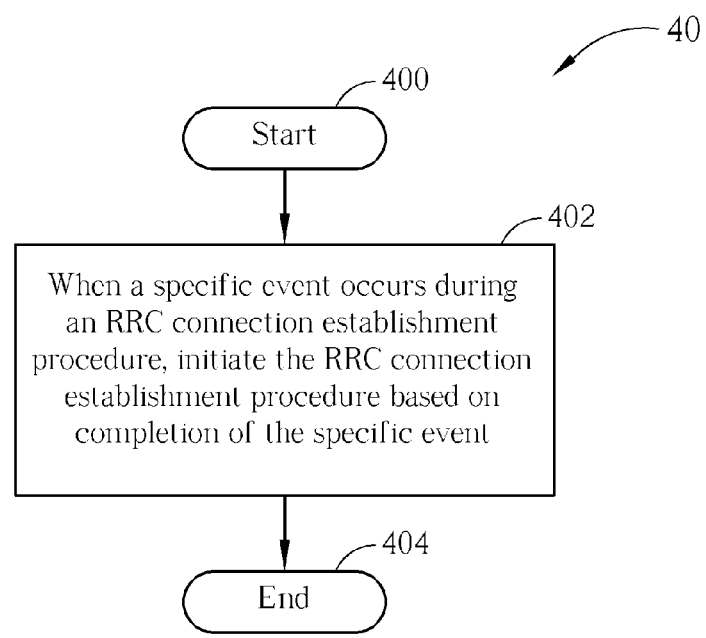
FIG. 11 to FIG. 14 are flowcharts of processes according to embodiments of the present invention.

Please refer to FIG. 11, which is a flowchart of a process 40 according to an embodiment of the present invention. The process 40 is utilized for improving Radio Resource Control (RRC) connection establishment for an RRC layer of a UE in the wireless communication system 10 and can be compiled into the program code 214. The process 40 includes the following steps:

Step 400: Start.

Step 402: When a specific event occurs during an RRC connection establishment procedure, initiate the RRC connection establishment procedure based on completion of the specific event.

Step 404: End.

In the process 40, the specific event may be cell reselection or cell barred. The specific timer may be a timer T3411 or a timer T3417. The timer T3411 is started when Non Access Stratum (NAS) layer of a UE receives a Tracking Area Update (TAU) request failure message or an attach request failure message. The timer T3417 is started when NAS sends a service request message. The RRC connection establishment procedure can be initiated by the TAU request message, the attach request message, the service request message, etc., which are connection request messages, or NAS messages in point view of UE NAS. Certainly, NAS can also request RRC to abort the RRC connection establishment procedure after cell reselection or cell barred is completed.

As for the described issues 1, 2, 3 and 4 in the prior art, NAS cannot initiate a TAU procedure or an attach procedure until the timer T3411 expires even when cell reselection is completed earlier or when cell barred is completed (a cell barred timer expires, in other words). NAS cannot initiate a service request procedure until the timer T3417 expires even if cell barred is completed earlier. Besides, when NAS receives a failure message during a service request procedure, NAS does not retransmit the service request message and nothing is done. Therefore, RRC connection establishment procedure is not performed efficiently and furthermore, the UE may miss calls.

Compared with the prior art, according to the process 40, when cell reselection or cell barred occurs during an RRC connection establishment procedure, UE RRC initiates the RRC connection establishment procedure based on completion of cell reselection or cell barred. In other words, UE RRC can immediately initiate the RRC connection establishment when cell reselection or cell barred is completed. Take the process 40 as the solution for issue 1, 3 and 4, the UE can immediately initiate the RRC connection establishment when cell reselection is completed or when cell barred is completed (meaning that the timer T305 or the timer T303 expires for example), which makes an efficient use of time for service access or receiving calls. Take the process 40 as the solution for issue 2, the UE can also immediately initiate the RRC connection establishment when cell reselection is completed, which avoids missed calls.

Furthermore, in other embodiments of the present invention, step 402 in the process 40 can be implemented as different actions described as follows. One is that UE RRC does not generate or block a failure message as a response to UE NAS while cell reselection or cell barred occurs, and then UE NAS does not start the timer T3411 and does not wait until the timer T3411 expires. The other is that UE RRC generates a success message to UE NAS when cell reselection or cell barred is completed, so NAS can initiate a connection request procedure according to the success message to continue trying to establish an RRC connection and does not require waiting until the timer T3411 expires. The above two embodiments make UE to perform service access or receive calls more efficiently after cell reselection or cell barred occurs is completed.

Figure 12:
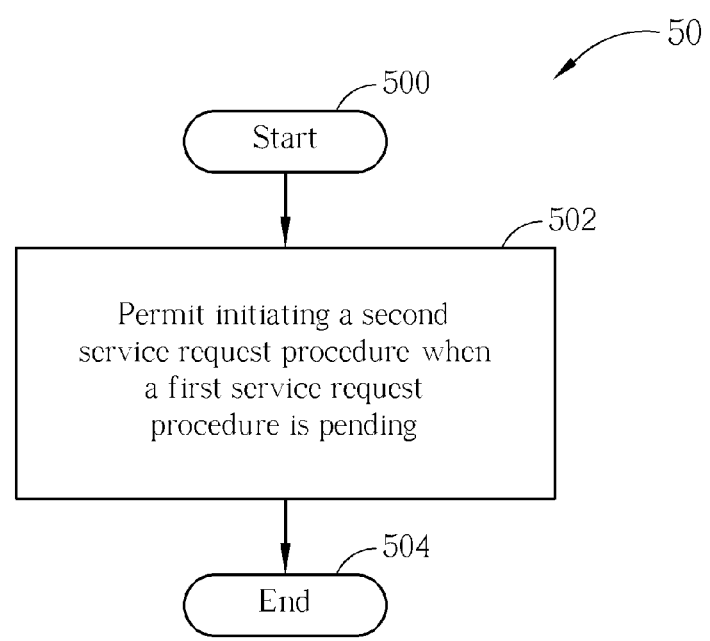

Please refer to FIG. 12, which is a flowchart of a process 50 according to an embodiment of the present invention. The process 50 is also utilized for improving RRC connection establishment for NAS layer of the UE and can be compiled into the program code 214. The process 50 includes the following steps:

Step 500: Start.

Step 502: Permit initiating a second service request procedure when a first service request procedure is pending.

Step 504: End.

In the process 50, the first service request procedure is pending due to cell reselection or cell barred. According to the process 50, NAS permits initiating the second service request procedure when the first service request procedure is pending. For example, when a paging is incoming, the UE can send a service request message as a paging response with a RRC connection establishment cause of Mobile Terminating (MT) access even if a preceding Mobile Originating (MO) call is pending.

From the above, the second service request procedure is independent of the first service request procedure and is not influenced by cell barred. These two procedures should have the timers T3417 respectively because they are independent. In other words, the first service request procedure starts its own timer T3417, and later, the second service request procedure starts its own timer T3417. Besides, RRC connection establishment causes should be in a priority of emergency call>high priority access>MT access>MO signalling=MO data. Obviously, an RRC connection establishment cause determined by the second service request procedure has a higher priority than an RRC connection establishment cause determined by the first service request procedure. In other words, NAS sends the second service request message with a higher priority RRC connection establishment cause.

As for the described issue 5 in the prior art, it is not clearly specified whether the UE can send another service request message when the original service request procedure is pending due to cell reselection or cell barred. In comparison, according to the process 50, NAS permits initiating the second service request procedure when the first service request procedure is pending, so that the MT call is not missed no more. Issue 5 is therefore solved by the process 50.

Figure 13:
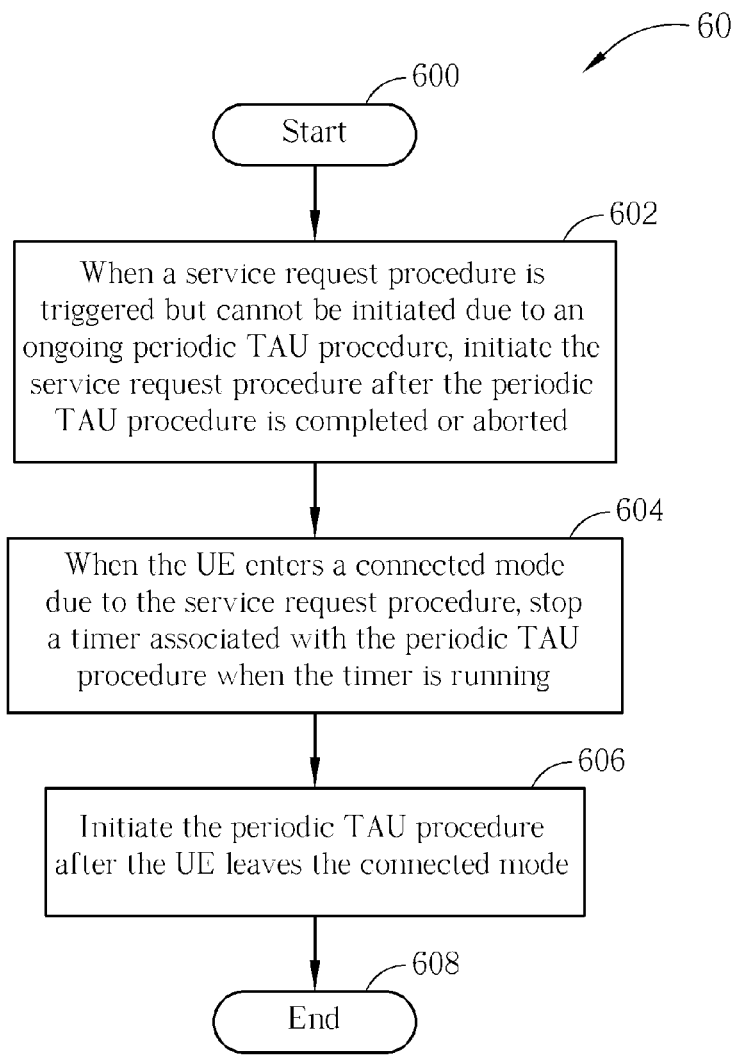

Please refer to FIG. 13, which is a flowchart of a process 60 according to an embodiment of the present invention. The process 60 is also utilized for improving RRC connection establishment for NAS layer of the UE and can be compiled into the program code 214. The process 60 includes the following steps:

Step 600: Start.

Step 602: When a service request procedure is triggered but cannot be initiated due to an ongoing periodic TAU procedure, initiate the service request procedure after the periodic TAU procedure is completed or aborted.

Step 604: When the UE enters a connected mode due to the service request procedure, stop a timer associated with the periodic TAU procedure when the timer is running.

Step 606: Initiate the periodic TAU procedure after the UE leaves the connected mode.

Step 608: End.

In the process 60, the connected mode is Evolved Packet System Mobility Management (EMM) connected mode, and the timer associated with the periodic TAU procedure is the timer T3411 started when a TAU request failure occurs, or a timer T3402. The timer T3402 is started when a TAU request failure occurs and an attempt counter used for counting a number of occurred TAU request failure is equal to a threshold (which is 5 in current specification). According to the process 60, the UE initiates the service request procedure after the periodic TAU procedure is completed or aborted, and the UE enters the EMM connected mode after the service request procedure is successfully completed. Then the UE stops the timer T3411 and the timer T3402 when they are running, for avoiding an unnecessary TAU procedure being performed. After the UE leaves the EMM connected mode, the UE initiates the periodic TAU procedure to continue the periodic TAU to the eNB.

As mentioned previously, issue 6 in the prior art illustrates the uncertainty of whether the UE re-initiates the service request procedure after the TAU procedure terminates, which results in the MT call missed. Compared with the prior art, according to the process 60, the UE initiates the service request procedure to enter the EMM connected mode after the periodic TAU procedure is completed or aborted, so that the MT call is not missed no more. Moreover, the UE stops unnecessary timers and continues performing the periodic TAU procedure when the UE leaves the EMM connected mode. Issue 6 is therefore solved by the process 60.

Figure 14:
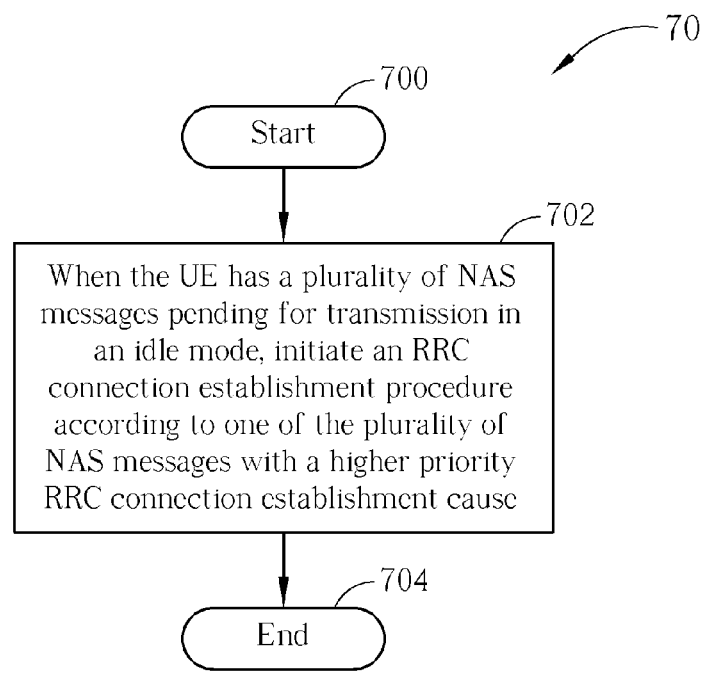

Please refer to FIG. 14, which is a flowchart of a process 70 according to an embodiment of the present invention. The process 70 is also utilized for improving RRC connection establishment for RRC layer of the UE and can be compiled into the program code 214. The process 70 includes the following steps:

Step 700: Start.

Step 702: When the UE has a plurality of NAS messages pending for transmission in an idle mode, initiate an RRC connection establishment procedure according to one of the plurality of NAS messages with a higher priority RRC connection establishment cause.

Step 704: End.

In the process 70, the idle mode is EMM idle mode. NAS messages are connection request messages transmitted by NAS, such as a TAU request message, an attach message and a service request message. Besides, RRC connection establishment causes should be in a priority of emergency call>high priority access>MT access>MO signalling=MO data.

Figure 1:
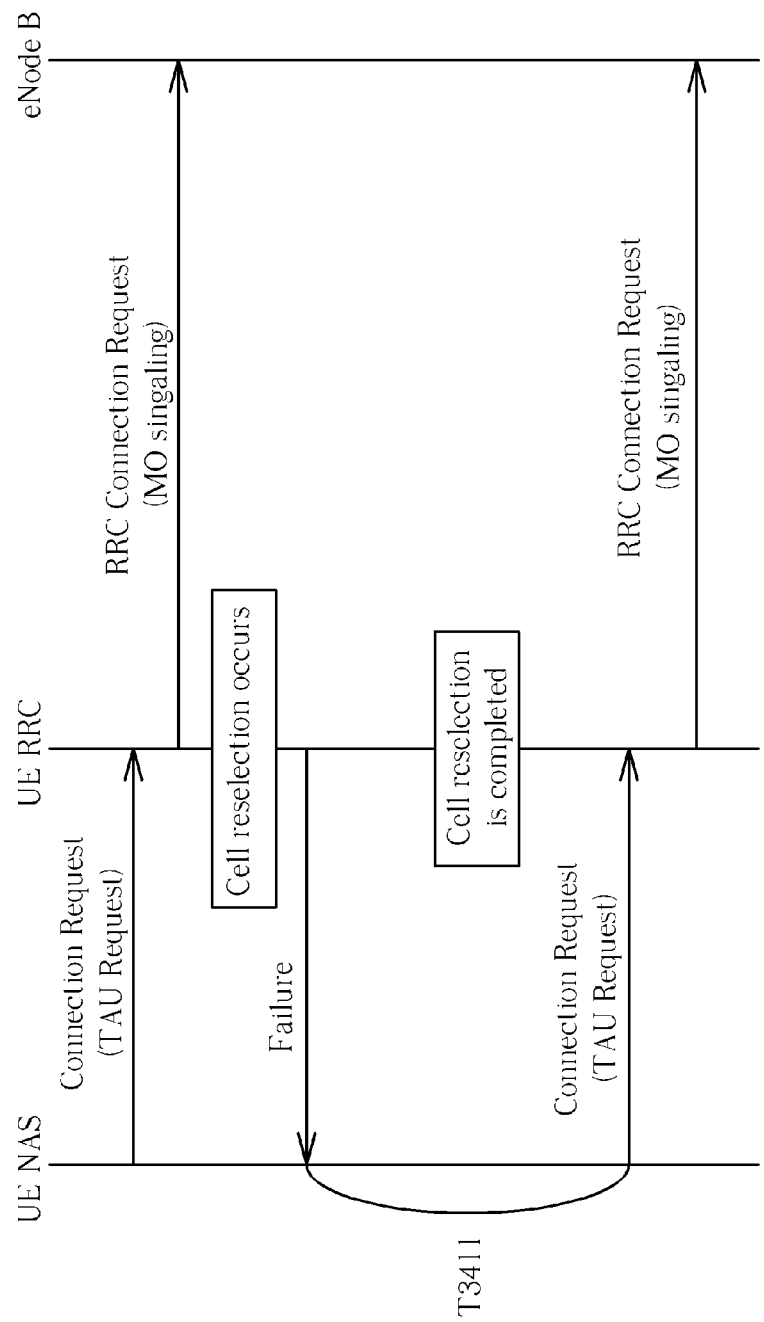
FIG. 1 to FIG. 8 are sequence diagrams of a NAS procedure during which lower layer failure occurs in a UE according to the prior art.
Figure 2:
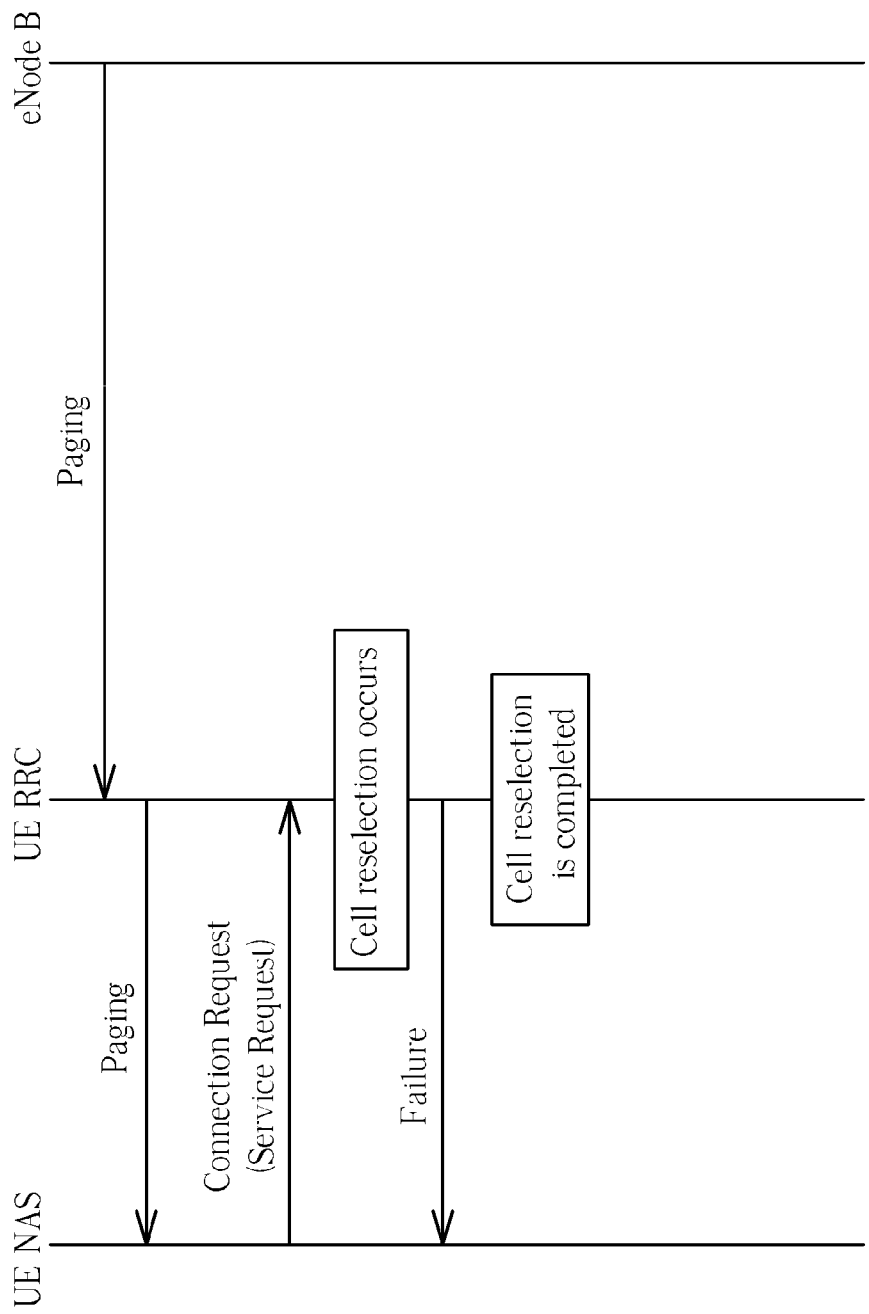
Figure 3:
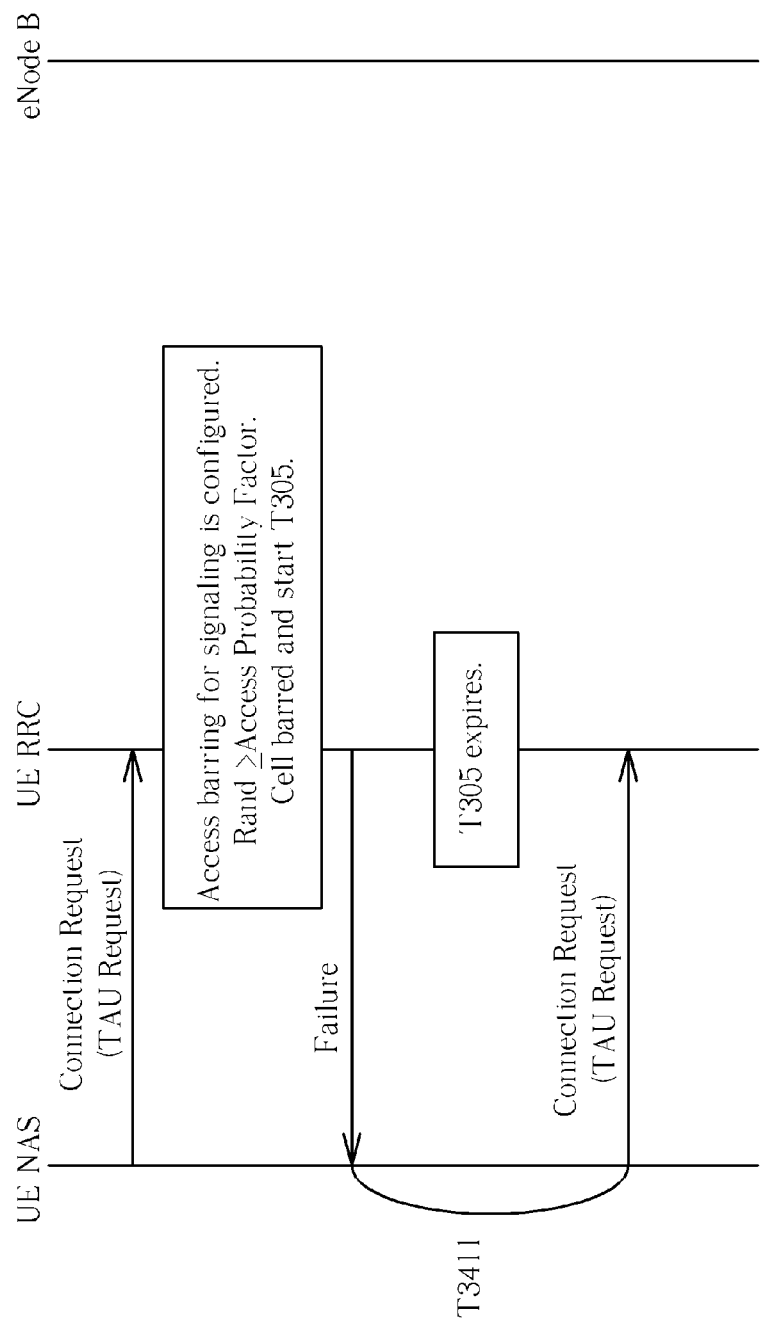
Figure 4:
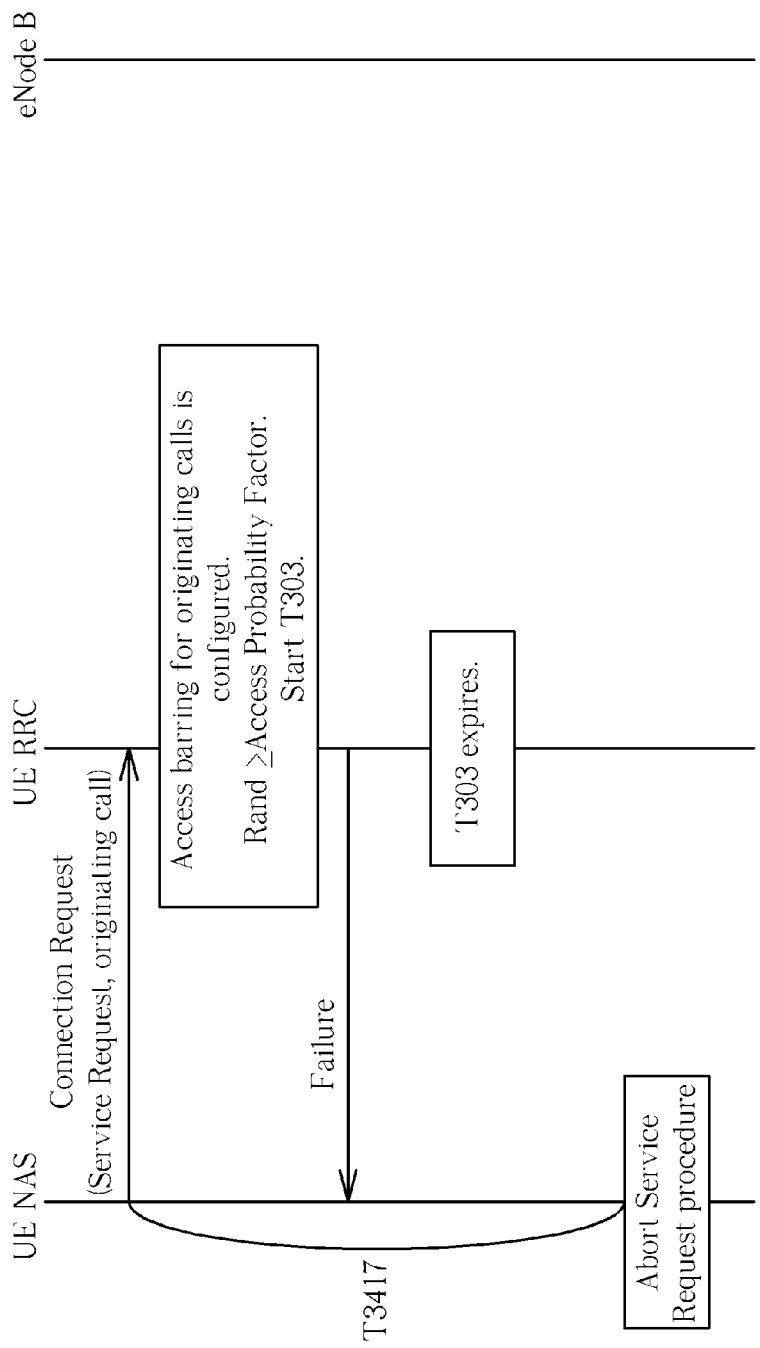
Figure 5:
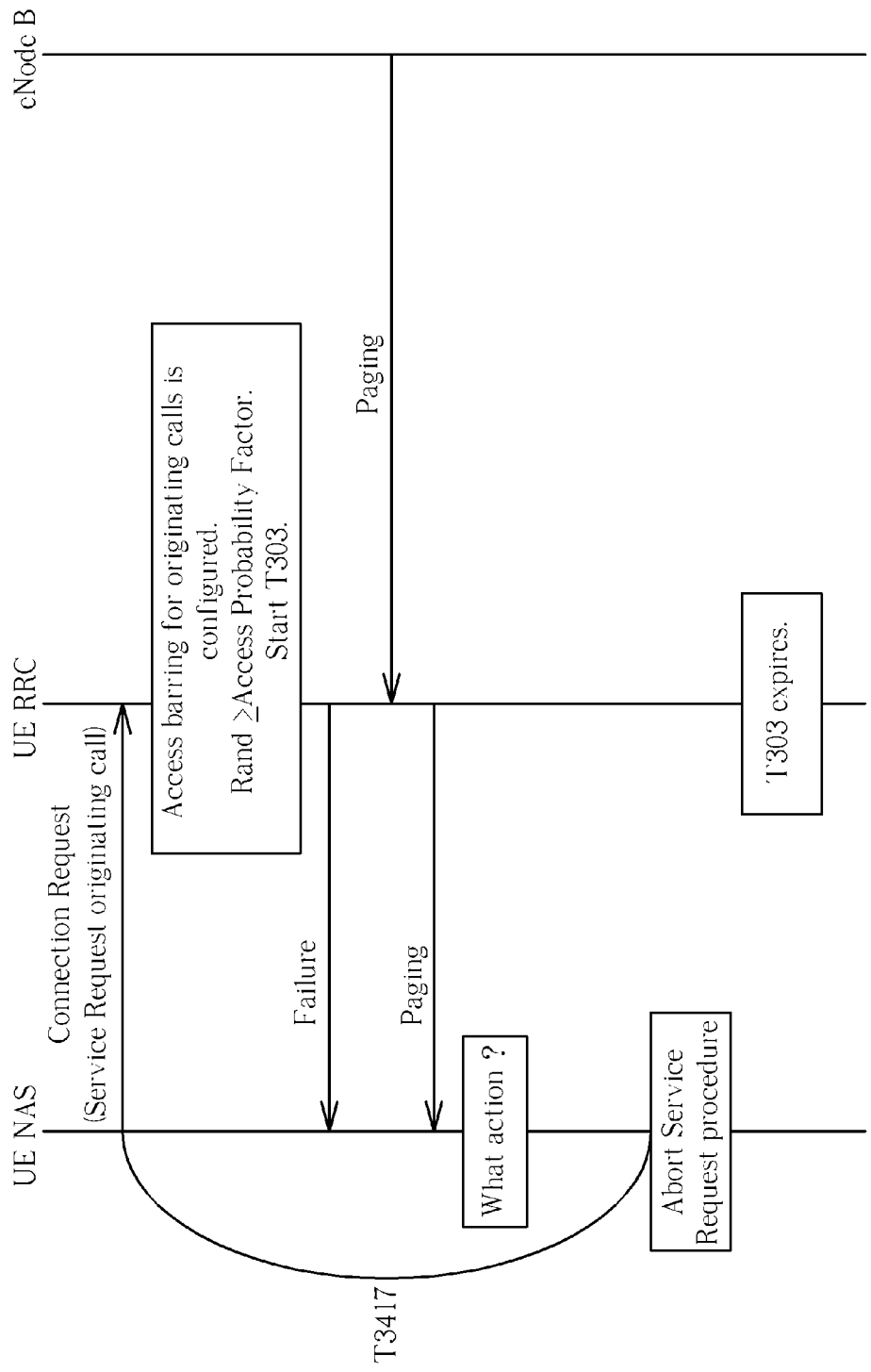
Figure 6:
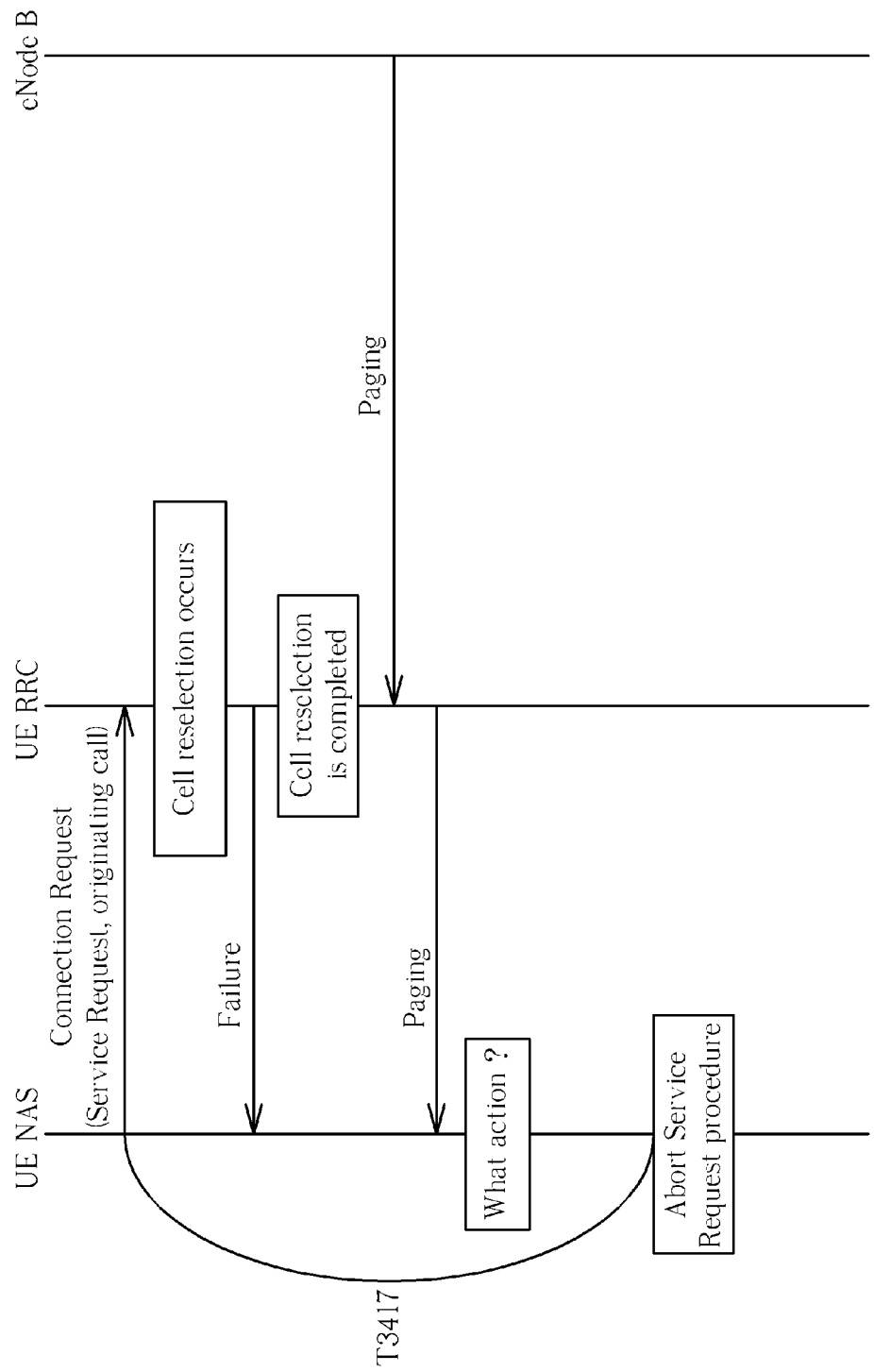
Figure 7:
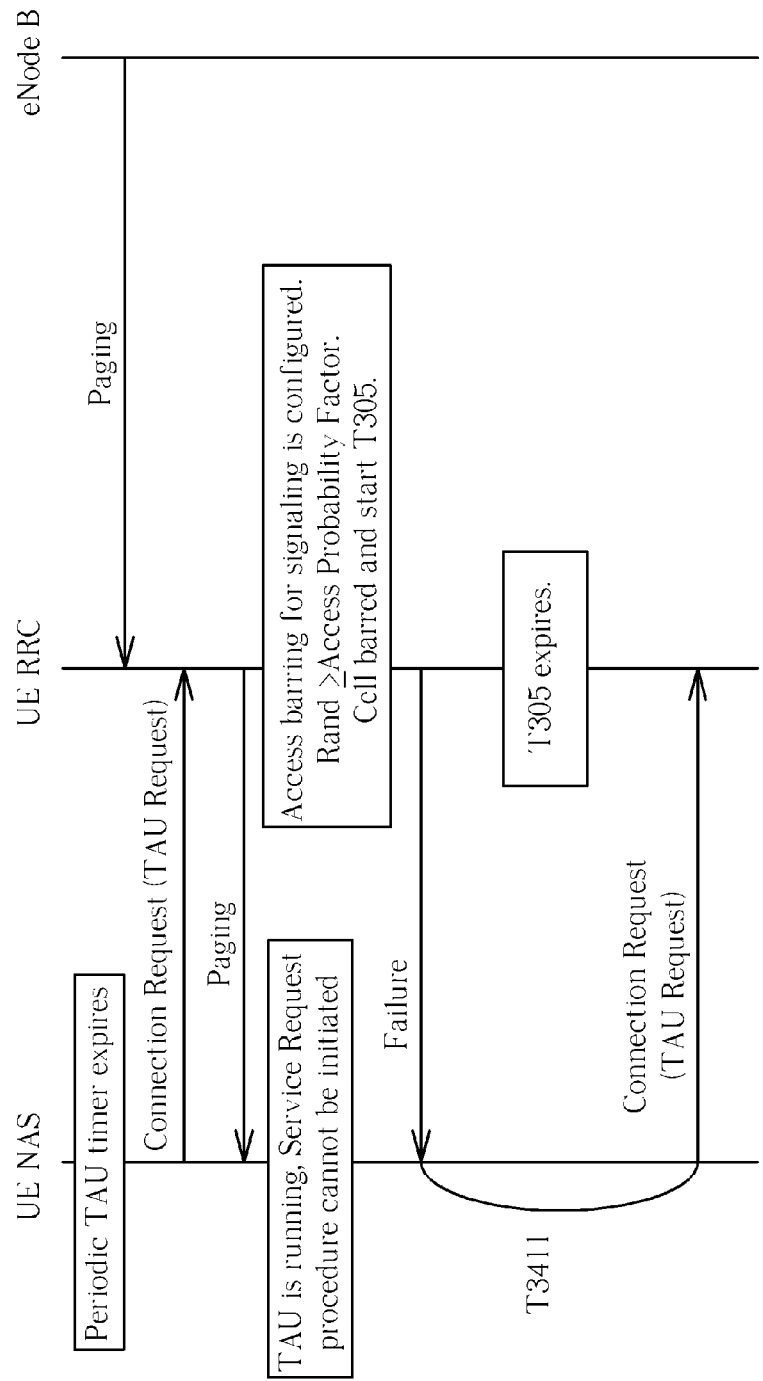
Figure 8:
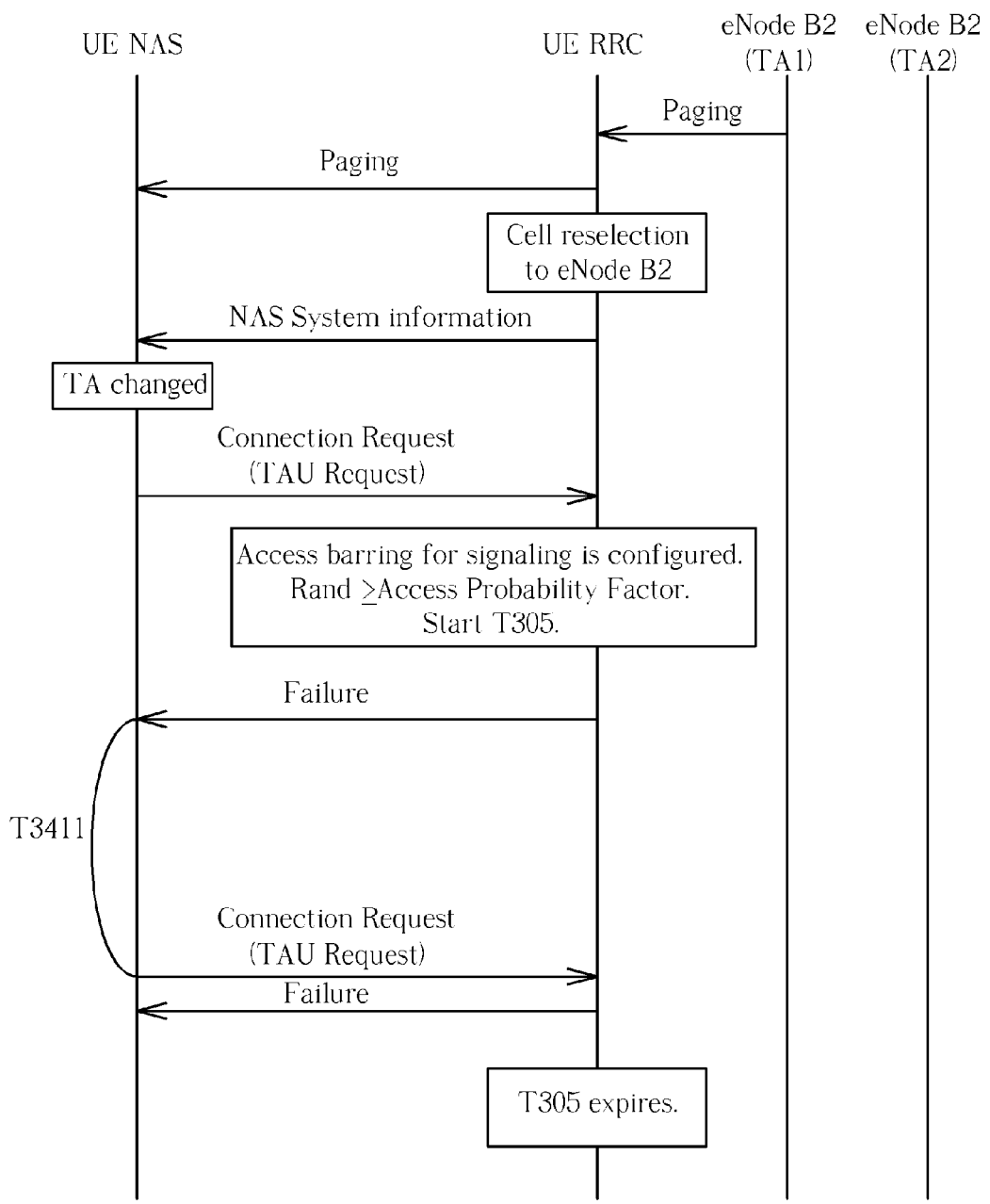

Take the scenario in FIG. 8 as an example, the UE has two pending NAS messages, a service request message with "MT access" as the RRC connection establishment cause and a TAU request message with "MO signalling" as the RRC connection establishment cause. According to the process 70, the UE initiates the RRC connection establishment procedure according to the service request message with "MT access", which has a higher priority than "MO signalling", so that the service request procedure with "MT access" can be performed first and the MT call is not missed.

As mentioned previously, issue 7 in the prior art points out that the service request procedure can only be initiated when no UE-initiated EMM specific procedure is ongoing. Compared with the prior art, according to the process 70, the UE initiates the RRC connection establishment procedure according to the NAS message with a higher priority RRC connection establishment cause, and therefore the MT call is not missed.

From the above, issue 7 is solved by the process 70. Please note that, the UE in issue 6 also has two pending NAS messages including the TAU request message for periodic TAU and the service request message for the MT call, so issue 6 also can be solved by the process 70.

In conclusion, according to the above embodiments of the present invention, the UE can initiate the RRC connection establishment procedure based on completion of the specific event for establishing an RRC connection more efficiently, permit initiating another service request procedure when the preceding service request procedure is pending, initiate the service request procedure after the periodic TAU procedure is completed or aborted, and initiate an RRC connection establishment procedure according to the priority of RRC connection establishment causes of a plurality of NAS messages. As a result, RRC connection establishment is highly improved.

Those skilled in the art will readily observe that numerous modifications and alterations of the device and method may be made while retaining the teachings of the invention.

What is claimed is:

1. A method of improving Radio Resource Control (RRC) connection establishment for an RRC layer of a user equipment (UE) in a wireless communication system, the method comprising:
receiving a connection request message from a Non Access Stratum (NAS) layer of the UE, for initiating an RRC connection establishment procedure;
when a cell reselection or a cell barred occurs during an RRC connection establishment procedure, initiating the RRC connection establishment procedure based on completion of the cell reselection or the cell barred even if a waiting time does not finish yet, wherein the waiting time starts when the NAS layer of the UE receives a connection request failure message corresponding to the occurrence of the cell reselection or the cell barred or when the NAS layer of the UE transmits a service request message to the RRC layer of the UE; and aborting the RRC connection establishment procedure, after the RRC layer of the UE receives a request for aborting the RRC connection establishment procedure from the NAS layer after the cell reselection or the cell barred is completed.

2. The method of claim 1, wherein the RRC connection establishment procedure is initiated by a tracking area update request message, an attach request message, or a service request message.

3. The method of claim 1, further comprising not generating or blocking a failure message to a Non Access Stratum layer of the UE when the cell reselection or the cell barred occurs.

4. The method of claim 1, further comprising generating a success message to a Non Access Stratum layer of the UE when the cell reselection or the cell barred is completed, for initiating a connection request procedure.

5. The method of claim 1, wherein the RRC connection establishment procedure can be aborted after the specific event is completed.

6. A method of improving Radio Resource Control connection establishment for a Non Access Stratum (NAS) layer of a user equipment (UE) in a wireless communication system, the method comprising:
permitting initiating a second service request procedure when a first service request procedure is pending, wherein the first or the second service request procedure is initiated for requesting an RRC layer of the UE to start an RRC connection establishment procedure and the RRC connection establishment procedure is aborted by the RRC layer after a cell reselection or a cell barred occurs, and an RRC connection establishment cause determined by the second service request procedure has a higher priority than an RRC connection establishment cause determined by the first service request procedure and the priorities of the RRC connection establishment causes are determined according to: emergency call>high priority access>mobile terminating access>mobile originating signalling=mobile originating data.

7. The method of claim 6, wherein the first service request procedure is pending due to a cell reselection or a cell barred.

8. The method of claim 6, wherein the second service request procedure is not influenced by the cell barred.

9. The method of claim 6, wherein the first service request procedure and the second service request procedure have associated timers running independently.

10. A method of improving Radio Resource Control (RRC) connection establishment for an RRC layer of a user equipment (UE) in a wireless communication system, the method comprising:
when the UE has a plurality of Non Access Stratum (NAS) messages pending for transmission in an idle mode, initiating an RRC connection establishment procedure according to one of the plurality of NAS messages with a higher priority RRC connection establishment cause, wherein the priorities of the RRC connection establishment causes are determined according to: emergency call>high priority access>mobile terminating access>mobile originating signalling=mobile originating data; and
aborting the RRC connection establishment procedure, after the RRC layer of the UE receives a request for aborting the RRC connection establishment procedure from the NAS layer after a cell reselection or a cell barred is completed.

11. The method of claim 10, wherein the idle mode is Evolved Packet System Mobility Management idle mode.

12. The method of claim 10, further comprising:
when a service request procedure is triggered but cannot be initiated due to an ongoing periodic Tracking Area Update (TAU) procedure, initiating the service request procedure after the periodic TAU procedure is completed or aborted.

13. The method of claim 12, further comprising
when the UE enters a connected mode due to the service request procedure, stopping a timer associated with the periodic TAU procedure when the timer is running.

14. The method of claim 13, further comprising
initiating the periodic TAU procedure after the UE leaves the connected mode.

15. The method of claim 13, wherein the connected mode comprises Evolved Packet System Mobility Management connected mode.

16. The method of claim 13, wherein the timer started when a TAU request failure occurs.

17. The method of claim 13, wherein the timer is started when a number of times of TAU request failure is equal to a threshold.

* * * * *